US010718308B2

(12) United States Patent
Ito

(10) Patent No.: US 10,718,308 B2
(45) Date of Patent: Jul. 21, 2020

(54) INTERNAL-COMBUSTION-ENGINE STARTING APPARATUS

(71) Applicant: Mitsubishi Electric Corporation, Tokyo (JP)

(72) Inventor: Tasuku Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/079,216

(22) PCT Filed: Jun. 15, 2016

(86) PCT No.: PCT/JP2016/067742

§ 371 (c)(1),
(2) Date: Aug. 23, 2018

(87) PCT Pub. No.: WO2017/216889

PCT Pub. Date: Dec. 21, 2017

(65) Prior Publication Data

US 2019/0136819 A1 May 9, 2019

(51) Int. Cl.
*F02N 15/04* (2006.01)
*F16D 41/18* (2006.01)
*F02N 15/02* (2006.01)

(52) U.S. Cl.
CPC ............. *F02N 15/04* (2013.01); *F02N 15/02* (2013.01); *F16D 41/185* (2013.01)

(58) Field of Classification Search
CPC ......... F02N 15/04; F02N 15/02; F16D 41/185
See application file for complete search history.

(56) References Cited

U.S. PATENT DOCUMENTS 2,899,829 A * 8/1959 Smith ..................... F16D 41/00 74/6
4,818,889 A * 4/1989 Kinoshita ............... F02N 15/04 290/48
4,862,027 A * 8/1989 Isozumi ................ F02N 15/066 310/99

(Continued)

FOREIGN PATENT DOCUMENTS

JP 2004-270616 A 9/2004
JP 2013-036351 A 2/2013

*Primary Examiner* — David Hamaoui

(74) *Attorney, Agent, or Firm* — Sughrue Mion, PLLC; Richard C. Turner

(57) ABSTRACT

There is provided an internal-combustion-engine starting apparatus that eliminates the restriction that the portion of the output axle at the axial-direction anti-motor side needs to be narrower than the inner diameter of an inner ring portion and that eliminates the requirement that a member for restricting the output axle from traveling toward the axial-direction anti-motor side is added as an extra component. An internal-combustion-engine starting apparatus is characterized in that the outer helical spline includes an outer ridge portion, in that an inner helical spline includes a both-side opened recess groove portion and a one-side opened recess groove portion in that the outer ridge portion engages with the one-side opened recess groove portion, and in that the axial-direction length of the inner small-diameter portion is the same as or larger than the axial-direction length of the outer ridge portion.

3 Claims, 3 Drawing Sheets

24
22
12
2
4
1
25
21
12
20
11
33
X
X1
X2

(56) References Cited

U.S. PATENT DOCUMENTS

| | | | | |
|---|---|---|---|---|
| 6,169,333 | B1 * | 1/2001 | Pentland | F02N 15/06<br>290/1 C |
| 6,752,032 | B2 * | 6/2004 | Yamauchi | F02N 15/06<br>403/348 |
| 6,819,005 | B2 * | 11/2004 | Wakahara | C23C 22/08<br>148/253 |
| 2004/0177710 | A1 * | 9/2004 | Kajino | F02N 15/022<br>74/7 A |
| 2013/0276579 | A1 * | 10/2013 | Abe | F02N 11/00<br>74/7 E |

* cited by examiner 16,53
17
15
14
5
81
1
54
30
31,35
52
51
22
12
C
25
13
21
24
42
4
33
34
X
X1
X2
3
8
20
11

INTERNAL-COMBUSTION-ENGINE STARTING APPARATUS

This application is a National Stage of International Application No. PCT/JP2016/067742 filed Jun. 15, 2016.

TECHNICAL FIELD

The present disclosure relates to an internal-combustion-engine starting apparatus that starts an internal combustion engine.

BACKGROUND ART

As described in PLT 1 and PLT 2 below, there has been known a starting apparatus in which the inner ring portion and the output axle of a one-way clutch are coupled with each other through helical spline coupling. In the technology disclosed in PLT 1, in order to receive axial-direction anti-motor-side thrust force that acts on the output axle through helical spline coupling, a stopper 16 is provided at the axial-direction anti-motor side of an outer helical spline provided in the inner circumferential surface of an inner ring portion.

In the technology disclosed in PLT 2, in order to receive axial-direction anti-motor-side thrust force that acts on the output axle through helical spline coupling, a ring-shaped member is fit to the axial-direction motor-side end portion of an inner helical spline provided on the outer circumferential surface of the output axle.

CITATION LIST

Patent Literature

PLT 1: JP 2004-270616 A
PLT 2: JP 2013-36351 A

SUMMARY OF INVENTION

Technical Problem

However, when in the technology disclosed in PLT 1, the assembly of the starting apparatus is considered, the stopper 16 that prevents the output axle from being inserted into the axial-direction motor side is provided in the inner circumferential surface of the inner ring portion. Accordingly, it is required to insert the output axle into the inner ring portion from the axial-direction motor side. In order to enable the insertion from the motor side to be performed, the portion of the output axle, which is at the axial-direction anti-motor side of the inner helical spline, needs to be narrower than the inner diameter of the inner ring portion. Therefore, in the technology disclosed in PLT 1, a flange portion with which the shift lever engages is an extra component separated from the output axle. That is to say, it is required that after the output axle is inserted into the inner ring portion, the flange portion is mounted on the output axle. Because it is required to restrict the flange portion from traveling in the axial-direction on the output axle, the flange portion needs to be fit to a groove provided in the output axle; thus, this groove may deteriorate the strength of the output axle.

In the technology disclosed in PLT 2, the output axle can be inserted into the inner ring portion from the axial-direction anti-motor side; thus, no problem like that in PLT 1 is posed. However, it is required that after the output axle is inserted into the inner ring portion, a ring-shaped member is fit to the inner helical spline on the output axle. The ring-shaped member needs to have a strength and a durability that is enough to receive the thrust force that acts on the output axle. Moreover, it is required that under the condition that the inner helical spline on the output axle is hidden in the radial-direction inner inside of the inner ring portion, the ring-shaped member is fit to the inner helical spline; thus, the working efficiency of the assembly is low.

Accordingly, there is desired an internal-combustion-engine starting apparatus that eliminates the restriction that the portion of the output axle, which is at the axial-direction anti-motor side of the inner helical spline, needs to be narrower than the inner diameter of the inner ring portion and that eliminates the requirement that the member for restricting the output axle from traveling toward the axial-direction anti-motor side is added as an extra component.

Solution to Problem

An internal-combustion-engine starting apparatus according to the present disclosure includes:

a motor;

a one-way clutch provided with a tubular outer ring portion to which rotation driving force of the motor is transferred, a tubular inner ring portion that is disposed at a radial-direction inner side of the outer ring portion and that an outer helical spline is formed on an inner circumferential surface of the inner ring portion, and a plurality of engagement members that make the outer ring portion and the inner ring portion engage with each other at a time of one-way rotation;

an output axle that can travel in an axial-direction and that an inner helical spline engaging with the outer helical spline is formed on a portion of an outer circumferential surface of the output axle at the axial-direction motor side; and a pinion gear coupled with a portion of the output axle at the axial-direction anti-motor side, wherein the outer helical spline is provided with an outer ridge portion that forms a tooth, wherein the inner helical spline is provided with:

- a both-side opened recess groove portion that is a recess groove portion whose axial-direction motor side and axial-direction anti-motor side are opened so that the outer ridge portion can pass therethrough toward the axial-direction motor side and the axial-direction anti-motor side; and
- a one-side opened recess groove portion that is a recess groove portion whose axial-direction motor side is closed and whose axial-direction anti-motor side is opened so that although obstructed from passing therethrough toward the axial-direction motor side, the outer ridge portion can pass therethrough toward the axial-direction anti-motor side, wherein the outer ridge portion engages with the one-side opened recess groove portion, wherein an outer diameter of an inner small-diameter portion that is a portion of the output axle at the axial-direction anti-motor side of the inner helical spline is smaller than an inner diameter of the tooth crest of the outer helical spline, wherein an outer diameter of an inner large-diameter portion that is a portion of the output axle at the axial-direction anti-motor side of the inner small-diameter portion is larger than the inner diameter of the tooth crest of the outer helical spline, and wherein an axial-direction length of the inner small-diameter portion is the same as or larger than an axial-direction length of the outer ridge portion.

Advantage of Invention

In the internal-combustion-engine starting apparatus according to the present disclosure, the outer ridge portion of the inner ring portion is inserted into the both-side opened recess groove portion from the axial-direction motor side, so that the output axle can be inserted into the inner ring portion from the axial-direction anti-motor side. After that, it is made possible that the outer ridge portion is extracted from the both-side opened recess groove portion toward the axial-direction anti-motor side and then is made to travel to the inner small-diameter portion. Then, it is made possible that the outer ridge portion is made to circumferentially travel in the inner small-diameter portion so as to be inserted into the one-side opened recess groove portion from the axial-direction anti-motor side; eventually, it is made possible the outer ridge portion engages with the one-side opened recess groove portion. As described above, the output axle can be inserted into the inner ring portion from the axial-direction anti-motor side. Thus, the restriction that the portion of the output axle at the axial-direction anti-motor side of the inner helical spline needs to be narrower than the inner diameter of the inner ring portion can be eliminated. Moreover, because eventually, the outer ridge portion engages with the one-side opened recess groove portion, the blocking portion of the one-side opened recess groove portion at the motor side abuts on the outer ridge portion; thus, the output axle is restricted from traveling toward the axial-direction anti-motor side. As a result, it is not required that a member for restricting the output axle from traveling toward the axial-direction anti-motor side is added as an extra component.

DESCRIPTION OF EMBODIMENTS

1. Embodiment 1

Figure 1:
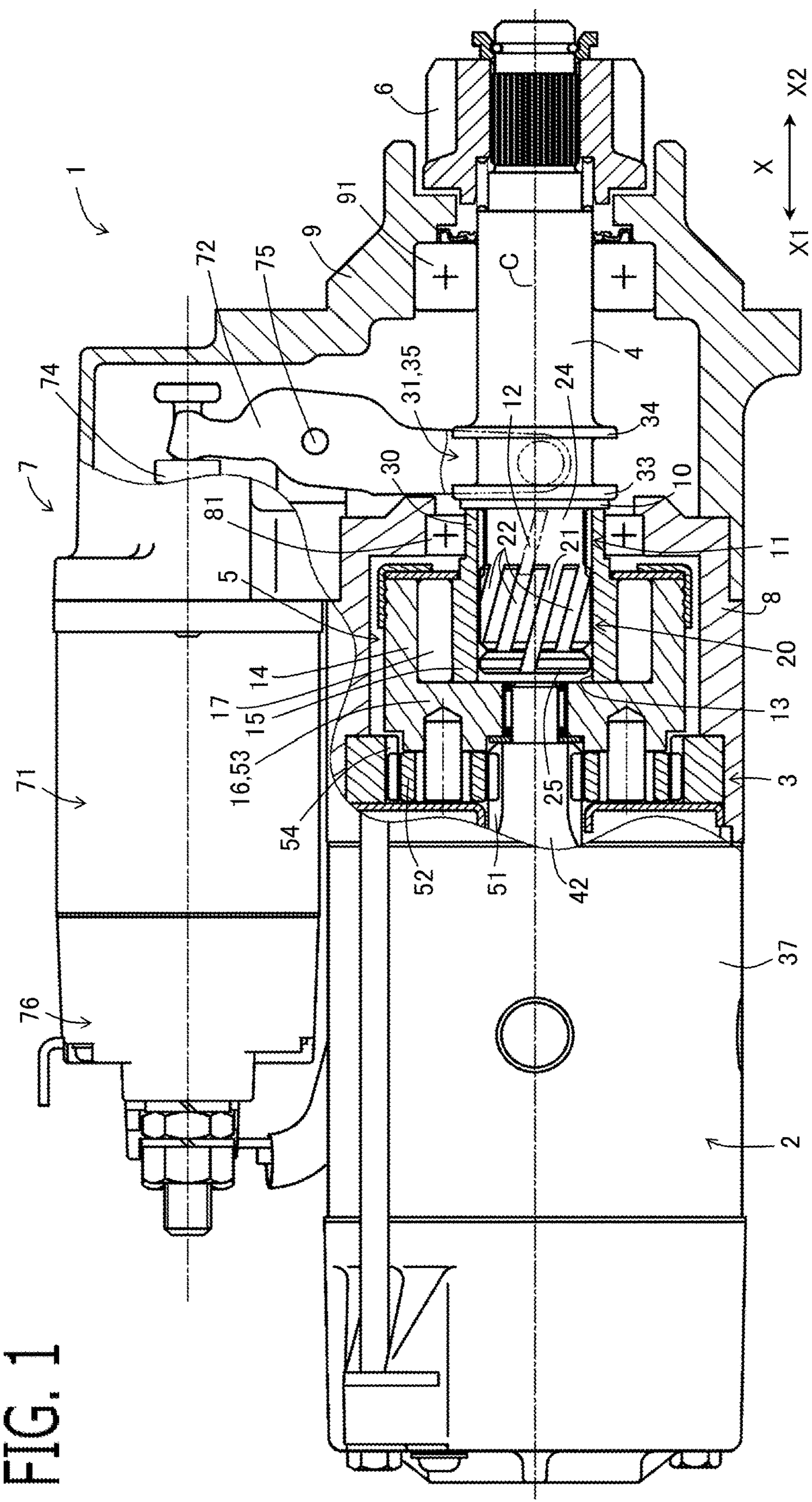
FIG. 1 is a partial cross-sectional view of an internal-combustion-engine starting apparatus according to Embodiment 1.

An internal-combustion-engine starting apparatus 1 (hereinafter, referred to simply as a starting apparatus 1) according to Embodiment 1 will be explained with reference to drawings. FIG. 1 is a partial cross-sectional view of the starting apparatus 1 taken along a plane that passes through a rotation axial center C of an output axle 4.

The direction that is parallel to the rotation axial center C of the output axle 4 is defined as an axial-direction X. A motor 2 is disposed concentrically with the output axle 4. Driving force output members such as the output axle 4 and the like of the motor 2 are arranged at one side (the right side in FIG. 1) of the motor 2 in the axial-direction X. In the side where the driving force output members are arranged, the side that approaches the motor 2 in the axial-direction X is defined as an axial-direction motor side X1 (the left side in FIG. 1). The side that departs from the motor 2 in the axial-direction X is defined as an axial-direction anti-motor side X2 (the right side in FIG. 1).

<Schematic Configuration of Starting Apparatus 1>

The motor 2 is an electric motor that has a cylindrical tubular stator fixed to the inner circumferential surface of a motor case 37 and a cylindrical tubular rotor that is disposed at the radial-direction inner side of the stator and is pivotably supported by a bearing. As the motor 2, a DC series-wound motor is utilized. The stator is provided with a winding included in an electromagnet, and the rotor is provided with a winding and a commutator. It may be allowed that the stator is provided with a permanent magnet.

Rotation driving force of the motor 2 is transferred to the output axle 4 through the intermediary of a one-way clutch 5. The one-way clutch 5 has an outer ring portion 14, an inner ring portion 15, and a plurality of engagement members 17. The outer ring portion 14 is a tubular (cylindrical tubular, in this example) member to which the rotation driving force of the motor 2 is transferred. The inner ring portion 15 is a tubular (cylindrical tubular, in this example) member that is disposed in the radial-direction inner side of the outer ring portion 14. An outer helical spline 11 is formed on the inner circumferential surface of the inner ring portion 15. The engagement member 17 is disposed in a space between the outer ring portion 14 and the inner ring portion 15 and engages the outer ring portion 14 with the inner ring portion 15 at a time of the one-way rotation.

The one-way clutch 5 is an overrun prevention mechanism of the starting apparatus 1. That is to say, the coupling of the one-way clutch 5 is implemented in the case where the rotation speed of the outer ring portion 14 at the motor 2 side is the same as or larger than the rotation speed of the inner ring portion 15 at the internal combustion engine side; the coupling of the one-way clutch 5 is cancelled in the case where due to the start of combustion in the internal combustion engine or the like, the rotation speed of the inner ring portion 15 is larger than the rotation speed of the outer ring portion 14.

In the present embodiment, the one-way clutch 5 is a cam type; the engagement member 17 is a cylindrical columnar roller; springs (unillustrated) for biasing the respective rollers toward one side in the circumferential direction are provided.

The inner ring portion 15 has an axial-direction extending portion 30 that extends toward the axial-direction anti-motor side X2 of the portion thereof that engages with the engagement member 17. The outer circumferential surface of the axial-direction extending portion 30 is pivotably supported by a center housing 8 through the intermediary of the bearing 81. The bearing 81 and the center housing 8 restrict the inner ring portion 15 from traveling toward the axial-direction anti-motor side X2, i.e., positioning of the inner ring portion 15 in the axial-direction X is implemented.

A rotor shaft 42 of the motor 2 is coupled with the outer ring portion 14 of the one-way clutch 5 through the intermediary of an epicyclic gear deceleration mechanism 3. The epicyclic gear deceleration mechanism 3 is disposed on the rotation axial center C in such a way as to be in the axial-direction space between the motor 2 and the one-way clutch 5. The epicyclic gear deceleration mechanism. 3 is a single-pinion-type epicyclic gear mechanism and includes carriers 53 that support a plurality of epicyclic gears 52 from the axial-direction anti-motor side X2, external-tooth sun gears 51 that engage with the epicyclic gears 52 from the radial-direction inner side, and ring gears 54 that engage with the epicyclic gears 52 from the radial-direction outer side. The sun gear 51 is formed in the rotor shaft 42; the carrier 53 is coupled with the outer ring portion 14; the ring gear 54 is fixed to the inner circumferential surface of the center housing 8.

The carrier 53 is formed in the shape of a cylindrical tube and is disposed at the axial-direction anti-motor side X2 of the epicyclic gear 52. The radial-direction outer end portion of the carrier 53 is coupled with the end portion of the outer ring portion 14 at the axial-direction motor side X1. In the present embodiment, the carrier 53 is formed integrally with the outer ring portion 14 and is a radial-direction extending portion 16 that extends from the end portion of the outer ring portion 14 at the axial-direction motor side X1 toward the radial-direction inner side. The radial-direction extending portion 16 extends to the radial-direction inner side of the inner ring portion 15 and is disposed at the axial-direction motor side X1 of the output axle 4. The endface of the inner ring portion 15 at the axial-direction motor side X1 abuts on the endface of the radial-direction extending portion 16 at the axial-direction anti-motor side X2. The inner circumferential surface of the radial-direction extending portion 16 supports the outer circumferential surface of the front-end portion of the rotor shaft 42 through the intermediary of a bearing.

The center housing 8 is a tubular case member that covers the respective radial-direction outer sides of the epicyclic gear deceleration mechanism 3 and the one-way clutch 5. The center housing 8 is fixed to the axial-direction anti-motor side X2 of the motor case 37.

An inner helical spline 20 is formed on a portion of the outer circumferential surface of the output axle 4 at the axial-direction motor side X1. The inner helical spline 20 engages with the outer helical spline 11 formed on the inner circumferential surface of the inner ring portion 15. The inner ring portion 15 and the output axle 4 are coupled with each other through helical spline coupling. The output axle 4 can travel in the axial-direction X through the driving force of a shift mechanism 7 and thrust force produced by relative pivoting between the outer helical spline 11 and the inner helical spline 20. The output axle 4 is formed in the shape of a cylindrical column that is concentric with the rotation axial center C.

A pinion gear 6 is coupled with the portion of the output axle 4 at the axial-direction anti-motor side X2. In the present embodiment, the outer circumferential surface of the output axle 4 and the inner circumferential surface of the pinion gear 6 are coupled with each other through spline coupling. A spring 22 biases the pinion gear 6 toward the axial-direction anti-motor side X2 of the output axle 4.

The portion of the output axle 4 at the axial-direction motor side X1 of coupling portion of the pinion gear 6 is pivotably supported by a front housing 9 through the intermediary of a bearing 91. The front housing 9 is a case member that covers the axial-direction anti-motor side X2 of the starting apparatus 1. The front housing 9 is fixed to the axial-direction anti-motor side X2 of the center housing 8.

A shift mechanism engagement portion 31 that engages with the shift mechanism 7 is provided in the vicinity of the middle of the output axle 4 in the axial-direction X. The shift mechanism engagement portion 31 is disposed at the axial-direction anti-motor side X2 of the bearing 81 that pivotably supports the inner ring portion 15. An engagement recess 35 that recesses toward the radial-direction inner side is provided in the shift mechanism engagement portion 31; a two-prong-fork-shaped front-end portion of a shift lever 72 of the shift mechanism. 7 is inserted into the engagement recess 35. The engagement recess 35 is a space between two annular-disk flange portions 33 and 34 that are formed to be spaced a gap apart from each other in the axial-direction X and protrude from the outer circumferential surface of the output axle 4 toward the radial-direction outer side. The flange portion 33 at the axial-direction motor side X1 is an after-mentioned inner large-diameter portion 33. The two flange portions 33 and 34 are formed integrally with the axle body of the output axle 4.

The shift mechanism 7 is an electric actuator that makes the output axle 4 travel in the axial-direction X. The shift mechanism 7 has an electromagnetic coil 71, a plunger 74, and the shift lever 72. The electromagnetic coil 71 attracts the plunger 74 to the axial-direction motor side X1 at a time of energization. The plunger 74 includes a magnetic material that can travel in the axial-direction X; a spring biases the plunger 74 toward the axial-direction anti-motor side X2. The electromagnetic coil 71 and the plunger 74 are arranged at the radial-direction outer side of the motor 2, the one-way clutch 5, the output axle 4, and the like.

The shift lever 72 transfers the travel of the plunger 74 in the axial-direction X to the output axle 4 by reversing the direction between the motor side X1 and the anti-motor side X2. The shift lever 72 is a rod-shaped member that can pivot on a supporting-point portion 75 provided in the middle thereof and extends in the radial direction. In the shift lever 72, the radial-direction outer end portion having the shape of a two-prong fork is engaged with a boss portion of the plunger 74, and the radial-direction inner end portion having the shape of a two-prong fork is engaged with the shift mechanism engagement portion 31 (engagement recess 35). For example, when a user turns on the starting switch, there occurs an energization state where a DC power source such as a battery supplies electric power to the electromagnetic coil 71, and when the starting switch is turned off, there occurs a non-energization state where the supply of electric power to the electromagnetic coil 71 is stopped.

The shift mechanism 7 is provided with a motor switch 76 that perform on/off-switching of the supply of DC electric power to the motor 2. The on/off contact of the motor switch 76 is disposed at the axial-direction motor side X1 of the plunger 74; when the amount of the travel of the plunger 74 toward the axial-direction motor side X1 becomes the same as or larger than a preliminarily set energization travel amount, the on/off contact is closed.

<Details of Configuration of Helical Spline>

The outer helical spline 11 formed on the inner circumferential surface of the inner ring portion 15 is provided with an outer ridge portion 12 that configures tooth of the outer helical spline 11. The outer ridge portion 12 protrudes from the inner circumferential surface of the inner ring portion 15 to the radial-direction inner side and extends obliquely with respect to the axial-direction X.

The outer ridge portion 12 is not provided over the whole circumference; there are provided the outer ridge portions 12 as many as or fewer than the half of the number (8, in this example) at a time when it is assumed that the outer ridge portions 12 are provided over the whole circumference. In the present embodiment, the number of the outer ridge portion 12 to be provided is one. A portion of the outer helical spline 11, at which no outer ridge portion 12 is provided, forms a wide recess portion of the outer helical spline 11.

The outer helical spline 11 (the outer ridge portion 12) is formed on the portion (in this example, the inner circumferential surface of the axial-direction extending portion 30) of the inner circumferential surface of the inner ring portion 15 at the axial-direction anti-motor side X2. The inner diameter of an outer large-diameter portion 13, which is a portion of the inner circumferential surface of the inner ring portion 15 at the axial-direction motor side X1 of the outer helical spline 11 (the outer ridge portion 12), is larger than the outer diameter of the tooth crest of the inner helical spline 20. Accordingly, the inner helical spline 20 can travel in the axial-direction X and the circumferential direction in the radial-direction inner side of the outer large-diameter portion 13. In the present embodiment, the inner diameter of the outer large-diameter portion 13 is equal to the inner diameter of the groove bottom surface of the outer helical spline 11. The inner diameter of the groove bottom surface of the outer helical spline 11 is larger than the outer diameter of the tooth crest of the inner helical spline 20. Each of the outer diameter and the inner diameter may be expressed by either a diameter or a radius. The axial-direction length of the outer large-diameter portion 13 is larger than the axial-direction length of the inner helical spline 20.

The inner helical spline 20 formed on a portion of the output axle 4 at the axial-direction motor side X1 is provided with a both-side opened recess groove portion 21 and a one-side opened recess groove portion 22. The both-side opened recess groove portion 21 and the one-side opened recess groove portion 22 form a tooth groove of the inner helical spline 20, with which the outer ridge portion 12 of the outer helical spline 11 can engage. The both-side opened recess groove portion 21 is a recess groove portion in which the axial-direction motor side X1 and the axial-direction anti-motor side X2 are opened so that the outer ridge portion 12 can pass therethrough toward the axial-direction motor side X1 and the axial-direction anti-motor side X2. The one-side opened recess groove portion 22 is a recess groove portion in which the axial-direction motor side X1 is closed and the axial-direction anti-motor side X2 is opened so that although obstructed from passing therethrough toward the axial-direction motor side X1, the outer ridge portion 12 can pass therethrough toward the axial-direction anti-motor side X2.

Each of the both-side opened recess groove portion 21 and the one-side opened recess groove portion 22 is formed by ridge portions that protrude from the outer circumferential surface of the output axle 4 toward the radial-direction outer side. Each of the both-side opened recess groove portion 21 and the one-side opened recess groove portion 22 extends obliquely with respect to the axial-direction X at an angle the same as that of the outer ridge portion 12 of the outer helical spline 11.

The number of the both-side opened recess groove portions 21 to be provided is at least the same as or larger than (in this example, the same as) the number of the outer ridge portion 12. In the case where a plurality of the outer ridge portions 12 are provided, the relative angle between the both-side opened recess groove portions 21 is the same as the relative angle between the outer ridge portions 12. As a result, in an after-mentioned assembly process, each of the outer ridge portions 12 can pass through the both-side opened recess groove portion 21 toward the axial-direction motor side X1 and the axial-direction anti-motor side X2. In the present embodiment, the recess groove portions of the inner helical spline 20 are provided over the whole circumference; one of the recess groove portions is the both-side opened recess groove portion 21, and the other (in this example, seven) recess groove portions are the one-side opened recess groove portions 22.

The both-side opened recess groove portion 21 extends up to the endface of the output axle 4 at the axial-direction motor side X1 and is opened to the endface. Accordingly, in the after-mentioned assembly process, the outer ridge portion 12 can be inserted into the both-side opened recess groove portion 21 from the axial-direction motor side X1. In contrast, the one-side opened recess groove portion 22 does not extend up to the endface of the output axle 4 at the axial-direction motor side X1; the portion of the one-side opened recess groove portion 22 at the axial-direction motor side X1 is a stopper portion 25 (blocking portion) that protrudes toward the radial-direction outer side up to the height of the tooth crest of the ridge portion of the inner helical spline 20. Accordingly, because obstructed by the stopper portion 25, the outer ridge portion 12 cannot travel from the one-side opened recess groove portion 22 toward the axial-direction motor side X1.

In the present embodiment, the stopper portion 25 is formed in the shape of a ring; respective ring-shaped grooves that each recess toward the radial-direction inner side are formed between the stopper portion 25 and the recess groove portion 21 and between the stopper portion 25 and the recess groove portion 22. In its portion at the both-side opened recess groove portion 21, the stopper portion 25 recesses toward the radial-direction inner side up to the outer diameter the same as that of the groove bottom surface and forms the opening of the both-side opened recess groove portion 21 at the axial-direction motor side X1.

After the assembly of the starting apparatus 1 has been completed, the outer ridge portion 12 engages with the one-side opened recess groove portion 22. Thus, when due to the thrust force of the helical spline and the driving force of the shift mechanism 7, the output axle 4 travels toward the axial-direction anti-motor side X2, the stopper portion 25 (blocking portion) of the one-side opened recess groove portion 22 abuts on the endface of the outer ridge portion 12 at the axial-direction motor side X1 and hence the output axle 4 is restricted from traveling toward the axial-direction anti-motor side X2. That is to say, the stopper portion 25 (the blocking portion) of the one-side opened recess groove portion 22 functions as a stopper that restricts the output axle 4 from traveling toward the axial-direction anti-motor side X2.

The outer diameter of an inner small-diameter portion 24, which is a portion of the output axle 4 at the axial-direction anti-motor side X2 of the inner helical spline 20, is smaller than the inner diameter of the tooth crest of the outer helical spline 11 (the outer ridge portion 12). Accordingly, the outer helical spline 11 (the outer ridge portion 12) can travel in the axial-direction X at the radial-direction outer side of the inner small-diameter portion 24. In the present embodiment, the outer diameter of the inner small-diameter portion 24 is equal to the outer diameter of the groove bottom surface of the inner helical spline 20. The outer diameter of the groove bottom surface of the inner helical spline 20 is smaller than the inner diameter of the tooth crest of the outer helical spline 11 (the outer ridge portion 12). The groove bottom surface of each of the both-side opened recess groove portion 21 and the one-side opened recess groove portion 22 is connected with the outer circumferential surface of the inner small-diameter portion 24.

Figure 2:
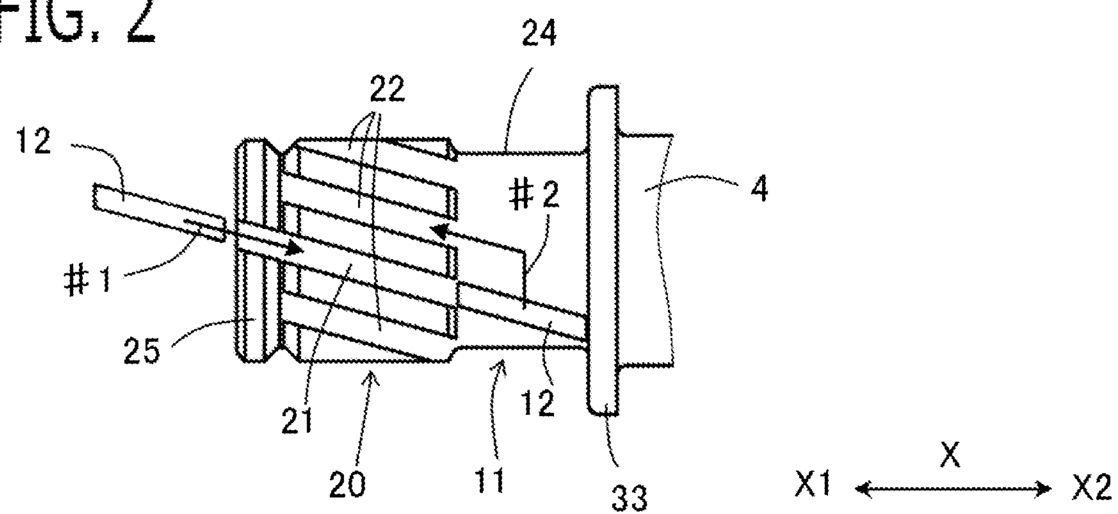
FIG. 2 is a principal-part side view for explaining the assembly of the internal-combustion-engine starting apparatus according to Embodiment 1.

The outer diameter of the inner large-diameter portion 33, which is a portion of the output axle 4 at the axial-direction anti-motor side X2 of the inner small-diameter portion 24, is larger than the inner diameter of the tooth crest of the outer helical spline 11 (the outer ridge portion 12). As illustrated in FIG. 2, in the after-mentioned assembly process, the outer ridge portion 12 abuts on the inner large-diameter portion 33; thus, the outer ridge portion 12 is restricted from traveling toward the axial-direction anti-motor side X2. in the present embodiment, as described above, the inner large-diameter portion 33 is the flange portion 33 of the shift mechanism engagement portion 31 and is formed integrally with the axle body of the output axle 4.

The axial-direction length of the inner small-diameter portion 24 is the same as or larger than the axial-direction length of the outer ridge portion 12. As illustrated in FIG. 2, this configuration makes it possible that in the after-mentioned assembly process, the outer ridge portion 12 can be disposed at the radial-direction outer side of the inner small-diameter portion 24; thus, the outer ridge portion 12 (the inner ring portion 15) and the inner small-diameter portion 24 (the output axle 4) can perform relative pivoting. Accordingly, as illustrated in FIG. 2, in the assembly process, it is made possible that after the outer ridge portion 12 is inserted into the both-side opened recess groove portion 21 from the axial-direction motor side X1 and is made to travel up to the inner small-diameter portion 24, the inner small-diameter portion 24 is made to travel in the circumferential direction in the inner small-diameter portion 24 and then is inserted into the one-side opened recess groove portion 22 from the axial-direction anti-motor side X2.

Figure 3:
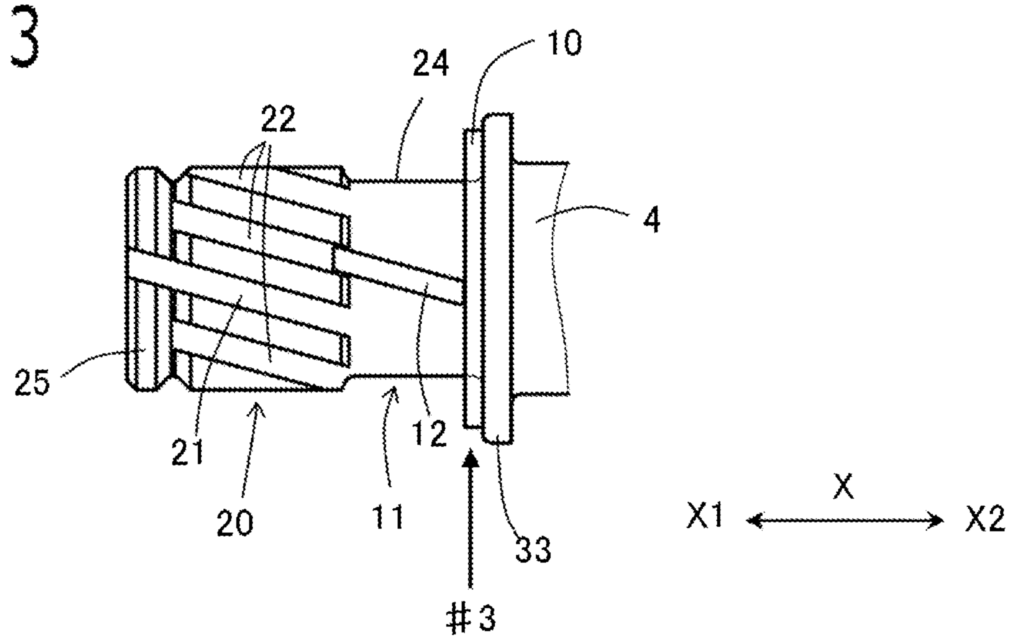
FIG. 3 is a principal-part side view for explaining the assembly of the internal-combustion-engine starting apparatus according to Embodiment 1.

As illustrated in FIGS. 1 and 3, after the assembly of the starting apparatus 1 has been completed, a ring-shaped spacer 10 is provided in such a way as to fit to the outer circumferential surface of the end portion of the inner small-diameter portion 24 at the axial-direction anti-motor side X2. The endface of the spacer 10 at the axial-direction anti-motor side X2 abuts on the endface of the inner large-diameter portion 33 at the axial-direction motor side X1; thus, the spacer 10 is supported by the inner large-diameter portion 33 from the axial-direction anti-motor side X2.

The axial-direction length obtained by subtracting the axial-direction length of the spacer 10 from the axial-direction length of the inner small-diameter portion 24 is shorter than the axial-direction length of the outer ridge portion 12. In this configuration, after the assembly process has been completed, the spacer 10 obstructs the outer ridge portion 12 from traveling toward the axial-direction anti-motor side X2; therefore, the outer ridge portion 12 cannot be extracted from the one-side opened recess groove portion 22 to the axial-direction anti-motor side X2. Therefore, the spacer 10 can maintain the state where the outer ridge portion 12 is being engaged with the one-side opened recess groove portion 22.

Moreover, when due to the driving force of the shift mechanism 7, the output axle 4 travels toward the axial-direction motor side X1, the spacer 10 abuts on the endface of the outer ridge portion 12 at the axial-direction anti-motor side X2 and hence the output axle 4 is restricted from traveling toward the axial-direction motor side X1. Accordingly, the spacer 10 and the inner large-diameter portion 33 function as stoppers that restrict the output axle 4 from traveling toward the axial-direction motor side X1.

In the present embodiment, the spacer 10 is a cylindrical tubular snap ring, a circumferential-direction part of which is cut off; when the spacer 10 is fit to the inner small-diameter portion 24, the diameter thereof is enlarged. The spacer 10 abuts also on the endface of the inner ring portion 15 at the axial-direction anti-motor side X2. When the spacer 10 abuts on the outer ridge portion 12 and the inner ring portion 15, a gap exists between the endface of the output axle 4 at the axial-direction motor side X1 and the radial-direction extending portion 16 disposed at the axial-direction motor side X1 of the output axle 4.

<Assembly Process of Starting Apparatus 1>

The assembly process of the starting apparatus 1 (the manufacturing method for the starting apparatus 1) will be explained.

In the step #1, the output axle 4 is inserted into the opening portion of the inner ring portion 15 at the axial-direction anti-motor side X2 from the end portion thereof at the axial-direction motor side X1 toward the axial-direction motor side X1. In this situation, as illustrated in FIG. 2, the outer ridge portion 12 is inserted into the both-side opened recess groove portion 21 from the axial-direction motor side X1 so that the outer ridge portion 12 engages with the both-side opened recess groove portion 21. After that, the outer ridge portion 12 is made to travel in the both-side opened recess groove portion 21 toward the axial-direction anti-motor side X2. Then, the outer ridge portion 12 is extracted from the both-side opened recess groove portion 21 to the axial-direction anti-motor side X2 and is disposed at the radial-direction outer side of the inner small-diameter portion 24.

Next, in the step #2, as illustrated in FIG. 2, the output axle 4 and the inner ring portion 15 are made to perform relative pivoting so that the respective circumferential-direction positions of the outer ridge portion 12 and the one-side opened recess groove portion 22 coincide with each other. Then, the outer ridge portion 12 is inserted into the one-side opened recess groove portion 22 from the axial-direction anti-motor side X2 so that the outer ridge portion 12 engages with the one-side opened recess groove portion 22.

Next, in the step #3, as illustrated in FIG. 3, while the outer ridge portion 12 engages with the one-side opened recess groove portion 22, the spacer 10 is made to fit to the outer circumferential surface of the end portion of the inner small-diameter portion 24 at the axial-direction anti-motor side X2. As a result, the state where the outer ridge portion 12 engages with the one-side opened recess groove portion 22 is maintained.

All or part of the assembly of the other components may be implemented either before the step #1 or after the step #3.

As described above, it is not required that the portion of the output axle 4 at the axial-direction anti-motor side X2 of the inner small-diameter portion 24 is made to pass through the radial-direction inner side of the inner ring portion 15. Accordingly, it is made possible that as is the case with the inner large-diameter portion 33 included in the shift mechanism engagement portion 31, the portion of the output axle 4 at the axial-direction anti-motor side X2 of the inner small-diameter portion 24 is made larger than the inner diameter of the inner ring portion 15. Thus, the number of the components and the assembly man-hours can be reduced, e.g., the flange portions 33 and 34 of the shift mechanism engagement portion 31 and the output axle 4 can be formed integrally with each other, and the strength of the output axle 4 and the flexibility in the shape thereof can be raised.

As the method of forming the outer helical spline 11, machining through a helical broach or forming through cold forging is common. However, in the case where as is the case with PLT 1, a stopper is provided in the outer helical spline, it is difficult to form the outer helical spline through a helical broach, and cold forging requires much die-manufacturing costs; thus these methods have not been suitable for the small-lot production. In contrast, in the case of the outer helical spline 11 according to the present embodiment, only the outer ridge portion 12 is formed; thus, the outer helical spline 11 can be formed through a helical broach. Meanwhile, as far as the inner helical spline 20 provided with the stopper portion 25 (blocking portion) is concerned, the technical difficulty is not high, e.g., the inner helical spline 20 can be processed only through rolling forming with combined two kinds of dies.

<Operation of Starting Apparatus 1>

As illustrated in FIG. 1, when the electromagnetic coil 71 of the shift mechanism 7 is not energized, the biasing force of the plunger spring makes the output axle 4 travel toward the axial-direction motor side X1. In this situation, the spacer 10 provided on the output axle 4 abuts on the endface of the outer ridge portion 12 at the axial-direction anti-motor side X2 and restricts the output axle 4 from traveling toward the axial-direction motor side X1.

When the starting switch is turned on, the electromagnetic coil 71 is energized and hence the plunger 74 travels toward the axial-direction motor side X1. The shift lever 72 reverses the travel of the plunger 74 toward the axial-direction motor side X1 into a travel toward the axial-direction anti-motor side X2 and transfers the travel toward the axial-direction anti-motor side X2 to the output axle 4. As a result, the output axle 4 travels toward the axial-direction anti-motor side X2.

The output axle 4 travels toward the axial-direction anti-motor side X2 until the end portion of the outer ridge portion 12 at the axial-direction motor side X1 abuts on the stopper portion 25 (the blocking portion) of the one-side opened recess groove portion 22 at the axial-direction motor side X1. In this situation, the pinion gear 6 also travels integrally with the output axle 4 toward the axial-direction anti-motor side X2 and then engages with the ring gear of the unillustrated internal combustion engine. After the output axle 4 travels toward the axial-direction anti-motor side X2 up to the position where the pinion gear 6 sufficiently engages with the ring gear, the on/off-contact of the motor switch 76 closes and hence the battery supplies electric power to the motor 2; as a result, the motor 2 produces rotation driving force.

The rotation driving force of the motor 2 is transferred to the output axle 4 through the intermediary of the epicyclic gear deceleration mechanism 3, the one-way clutch 5, and the helical spline coupling portion. The rotation driving force transferred to the output axle 4 is transferred to the crankshaft of the internal combustion engine through the intermediary of the pinion gear 6 and the ring gear, so that the rotation speed of the internal combustion engine is increased. When the combustion of the internal combustion engine starts, the output torque of the internal combustion engine increases the rotation speed of the internal combustion engine; thus, the coupling of the one-way clutch 5 is cancelled and hence the motor 2 is prevented from overrunning.

When the starting switch is turned off, the energization of electromagnetic coil 71 stops; then, due to the biasing force of the plunger coil, the plunger 74 travels toward the axial-direction anti-motor side X2. The shift lever 72 reverses the travel of the plunger 74 toward the axial-direction anti-motor side X2 into a travel toward the axial-direction motor side X1 and transfers the travel toward the axial-direction motor side X1 to the output axle 4. As a result, the output axle 4 travels toward the axial-direction motor side X1. As illustrated in FIG. 1, until the spacer 10 provided on the output axle 4 abuts on the endface of the outer ridge portion 12 at the axial-direction anti-motor side X2, the output axle 4 travels toward the axial-direction motor side X1.

2. Embodiment 2

Figure 4:
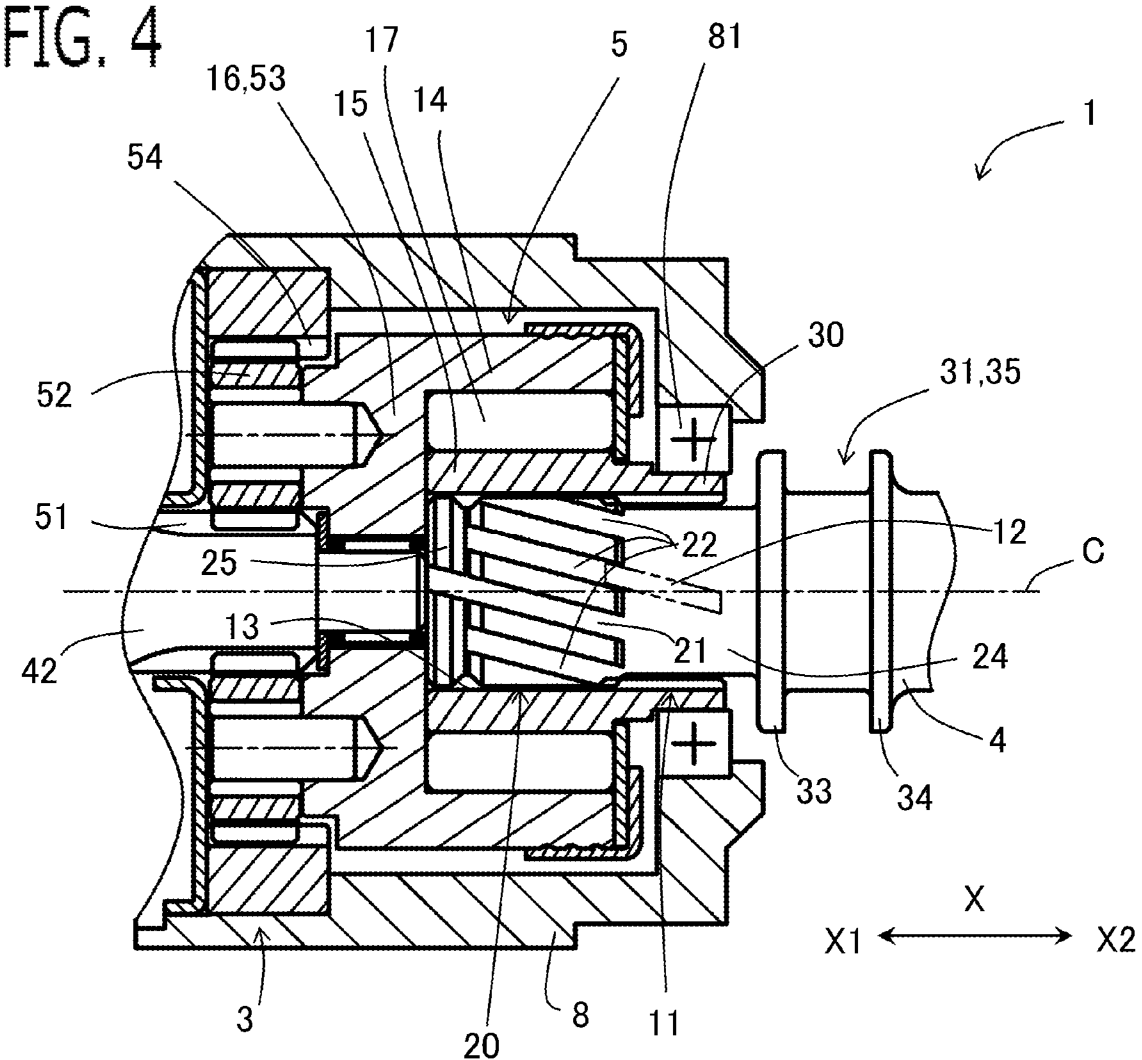
FIG. 4 is a principal-part cross-sectional view of an internal-combustion-engine starting apparatus according to Embodiment 2.

A starting apparatus 1 according to Embodiment 2 will be explained. The explanation for constituent parts that are the same as those in Embodiment 1, described above, will be omitted. FIG. 4 is a principal-part cross-sectional view of the starting apparatus 1 according to Embodiment 2. The basic configuration of the starting apparatus 1 according to the present embodiment is similar to that of Embodiment 1; however, unlike Embodiment 1, the spacer 10 is not provided.

In the present embodiment, the endface of the output axle 4 at the axial-direction motor side X1 abuts on the endface of the radial-direction extending portion 16 at the axial-direction anti-motor side X2, so that the output axle 4 is restricted from traveling toward the axial-direction motor side X1. When the endface of the output axle 4 at the axial-direction motor side X1 abuts on the endface of the radial-direction extending portion at the axial-direction anti-motor side X2, the respective axial-direction positions of the outer ridge portion 12 and the one-side opened recess groove portion 22 overlap with each other. In this configuration, unlike Embodiment 1 in which the spacer 10 is provided, the output axle 4 can be restricted from traveling toward the axial-direction motor side X1, by use of the radial-direction extending portion 16 disposed at the axial-direction motor side X1 of the output axle 4; thus, the structure can be simplified. Because the radial-direction extending portion 16 receives the travel of the output axle toward the axial-direction motor side X1, the strength of the stopper can be secured. Moreover, the radial-direction extending portion 16 maintains the state where the outer ridge portion 12 is being engaged with the one-side opened recess groove portion 22.

The axial-direction length between the endface of the radial-direction extending portion 16 at the axial-direction anti-motor side X2 and the endface of the outer helical spline 11 at the axial-direction motor side is shorter than the axial-direction length of the inner helical spline 20. The endface of the inner ring portion 15 at the axial-direction motor side X1 abuts on the endface of the radial-direction extending portion 16 at the axial-direction anti-motor side X2. The axial-direction length of the outer large-diameter portion 13 of the inner ring portion 15 is shorter than the axial-direction length of the inner helical spline 20.

The assembly process of the starting apparatus 1 according to the present embodiment will be explained. The step #1 is implemented while the inner ring portion 15 is separated from the radial-direction extending portion 16 (the outer ring portion 14). That is to say, the step #1 is implemented while the one-way clutch 5 is disassembled. The other points are the same as those in the step #1 in Embodiment 1; therefore, the explanation therefor will be omitted.

Next, the step #2 according to the present embodiment is the same as the step #2 in Embodiment 1; therefore, the explanation therefor will be omitted. Then in the step #3, the one-way clutch 5 is assembled, and the radial-direction extending portion 16 is disposed at the axial-direction motor side X1 of the output axle 4.

Other Embodiments

Lastly, other embodiments of the present disclosure will be explained. Each of the configurations of embodiments to be explained below is not limited to be separately utilized but can be utilized in combination with the configurations of other embodiments as long as no discrepancy occurs.

(1) In each of the foregoing embodiments, there has been explained, as an example, a case where the number of the outer ridge portions 12 to be provided is one and the number of the both-side opened recess groove portions 21 to be provided is one. However, embodiments of the present disclosure are not limited to the foregoing case. That is to say, it may be allowed that the number of the outer ridge portions 12 to be provided is two or more and the number of the both-side opened recess groove portions 21 to be provided is the same as or larger than the number of the outer ridge portions 12. In this case, the relative angle between the both-side opened recess groove portions 21 is the same as the relative angle between the outer ridge portions 12. For example, it may be allowed either that two outer ridge portions 12 are provided spaced by 180° apart from each other and two both-side opened recess groove portions 21 are provided spaced by 180° apart from each other or that four outer ridge portions 12 are provided spaced by 90° apart from one another and four both-side opened recess groove portions 21 are provided spaced by 90° apart from one another.

(2) In each of the foregoing embodiments, there has been explained, as an example, a case where the recess groove portions of the inner helical spline 20 are provided over the whole circumference, where one of the recess groove portions is the both-side opened recess groove portion 21, and where the other recess groove portions are the one-side opened recess groove portions 22. However, embodiments of the present disclosure are not limited to the foregoing case. That is to say, it is only necessary that in order to function as a stopper, at least one one-side opened recess groove portion 22 is provided. Therefore, it is not required that the recess groove portions of the inner helical spline 20 are provided over the whole circumference.

When the number of the one-side opened recess groove portions 22 to be provided is the same as the number of the outer ridge portions 12, the function and the strength of the stopper can be strengthened. In this case, the relative angle between the one-side opened recess groove portions 22 is the same as the relative angle between the outer ridge portions 12. For example, it may be allowed either that two outer ridge portions 12 are provided spaced by 180° apart from each other and two one-side opened recess groove portions 22 are provided spaced by 180° apart from each other or that four outer ridge portions 12 are provided spaced by 90° apart from one another and four one-side opened recess groove portions 22 are provided spaced by 90° apart from one another.

(3) In each of the foregoing embodiments, there has been explained, as an example, a case where the rotation speed of the motor 2 is decelerated by the epicyclic gear deceleration mechanism 3 and is transferred to the one-way clutch 5. However, embodiments of the present disclosure are not limited to the foregoing case. That is to say, it may be allowed that the rotation speed of the motor 2 is decelerated by a speed reducer having a mechanism different from the epicyclic gear deceleration mechanism 3 and is transferred to the one-way clutch 5. Alternatively, it may be allowed that the rotation speed of the motor 2 is directly transferred to the one-way clutch 5.

(4) In each of the foregoing embodiments, there has been explained, as an example, a case where the shift mechanism 7 is configured in such a way that the driving force of each of the electromagnetic coil 71 and the plunger 74 is transferred to the output axle 4 by use of the shift lever 72. However, embodiments of the present disclosure are not limited to the foregoing case. That is to say, it may be allowed that the shift mechanism 7 is configured in such a way that the driving force of each of the electromagnetic coil 71 and the plunger 74 is transferred to the output axle 4 without utilizing the shift lever 72. Alternatively, it may be allowed that the shift mechanism 7 is not provided and that thrust force produced by relative pivoting between the outer helical spline 11 and the inner helical spline 20 makes the output axle 4 travel toward the axial-direction anti-motor side X2 or toward the axial-direction motor side X1.

In the scope of the present disclosure, the embodiments thereof can freely be combined with one another and can appropriately be modified or omitted.

REFERENCE SIGNS LIST

1: internal-combustion-engine starting apparatus,
2: motor
3: epicyclic gear deceleration mechanism
4: output axle
5: one-way clutch
6: pinion gear
7: shift mechanism
10: spacer
11: outer helical spline
12: outer ridge portion
13: outer large-diameter portion
14: outer ring portion
15: inner ring portion
16: radial-direction extending portion
17: engagement member
20: inner helical spline
21: both-side opened recess groove portion
22: one-side opened recess groove portion
24: inner small-diameter portion
25: stopper portion
30: axial-direction extending portion
33: inner large-diameter portion
C: rotation axial center
X1: axial-direction motor side
X2: axial-direction anti-motor side

The invention claimed is:

1. An internal-combustion-engine starting apparatus comprising:
- a motor;
- a one-way clutch provided with a tubular outer ring portion to which rotation driving force of the motor is transferred, a tubular inner ring portion disposed at a radial-direction inner side of the tubular outer ring portion an outer helical spline formed on an inner circumferential surface of the tubular inner ring, portion, and a plurality of engagement members that make the tubular outer ring portion and the tubular inner ring portion engage with each other at a time of one-way rotation;
- an output axle configured to travel in an axial direction and comprisiing an inner helical spline engaging with the outer helical spline that is formed on a portion of an outer circumferential surface of the output axle at an axial-direction motor side of the ouput axle that is disposed proximate to the motor; and
- a pinion gear coupled with a portion of the output axle at an axial-direction anti-motor side of the output axle that is disposed distally to the motor, wherein the outer helical spline is provided with an outer ridge portion that forms a tooth, wherein the inner helical spline is provided with:

a both-side opened recess groove portion that is a first recess groove portion comprising an axial-direction motor side disposed proximate to the motor and an axial-direction anti-motor side disposed distally to the motor that are opened so that the outer ridge portion can pass therethrough when inserted toward the axial-direction motor side on the axial-direction anti-motor side, of the first recess groove portion; and a one-side opened recess groove portion that is a second recess groove portion comprising an axial-direction motor side disposed proximate to the motor that is closed and an axial-direction anti-motor side disposed distally to the motor that is opened so that the outer ridge portion is obstructed from passing therethrough when inserted toward the axial-direction motor side of the second recess groove portion, and can pass therethrough when inserted toward the axial-direction anti-motor side of the second recess groove portion, wherein the outer ridge portion engages with the second recess groove portion, wherein an outer diameter of an inner small-diameter portion that is a portion of the output axle at an axial-direction anti-motor side of the inner helical spline that is disposed distally from the motor is smaller than an inner diameter of the outer ridge portion of the outer helical spline, wherein an outer diameter of an inner large-diameter portion that is a portion of the output axle at an axial-direction anti-motor side of the inner small-diameter portion that is disposed distally from the motor is larger than the inner diameter of the outer ridge portion of the outer helical spline, and wherein an axial-direction length of the inner small-diameter portion is the same as or larger than an axial-direction length of the outer ridge portion.

2. The internal-combustion-engine starting apparatus according to claim 1, further comprising, a ring-shaped spacer that is fit to an outer circumferential surface of an end portion of the inner small-diameter portion at the axial-direction anti-motor side, wherein an axial-direction length obtained by subtracting an axial-direction length of the ring-shaped spacer from the axial-direction length of the inner small-diameter portion is shorter than the axial-direction length of the outer ridge portion.

3. The internal-combustion-engine starting apparatus according to claim 1, wherein an end portion of the tubular outer ring portion at the axial-direction motor side is coupled with a radial-direction extending portion that extends toward the radial-direction inner side, wherein an endface of the output axle at the axial-direction motor side abuts on an endface of the radial-direction extending portion at the axial-direction anti-motor side, so that the output axle is restricted from traveling toward the axial-direction motor side, and wherein when the endface of the output axle at the axial-direction motor side abuts on the endface of the radial-direction extending portion at the axial-direction anti-motor side, the respective axial-direction positions of the outer ridge portion and the one-side opened recess groove portion overlap with each other.

* * * * *